Aug. 12, 1969

J. L. LORENZ 3,460,352

DEFROST CONTROL

Filed July 31, 1967

INVENTOR.
JEROME L. LORENZ
BY
ATTORNEYS

INVENTOR.
JEROME L. LORENZ
ATTORNEYS

United States Patent Office 3,460,352
Patented Aug. 12, 1969

3,460,352
DEFROST CONTROL
Jerome L. Lorenz, Columbus, Ohio, assignor to Ranco
Incorporated, Columbus, Ohio, a corporation of Ohio
Filed July 31, 1967, Ser. No. 657,252
Int. Cl. F25d 21/06, 17/04
U.S. Cl. 62—153                                    23 Claims

ABSTRACT OF THE DISCLOSURE

A refrigerator including an air cooling unit, a defrosting heater for removing frost from heat exchange surfaces of the cooling unit, and control apparatus for the defrosting heater including an electric motor operated switch for initiating and terminating operation of the defrosting heater, the switch being actuated to energize the heater after a predetermined cumulative amount of operation of the electric motor and in which the motor is operated at intervals depending upon the humidity of air ambient the refrigerator and for the duration of openings of a door of the refrigerator.

---

The present invention relates to controls for refrigeration systems and more particularly relates to defrosting controls for an air cooling unit in a refrigerator or similar device.

Refrigeration systems having defrosting means which are operated at fixed intervals are generally known, but such defrosting systems are subject to performing unduly frequent or too infrequent defrosting cycles depending upon the prevailing relative humidity of the air ambient the refrigeration system. More specifically, an enclosed air space to be refrigerated, such as may be found in a domestic refrigerator, is maintained at a relatively constant humidity by the air chilling heat exchanger or unit therein which because of its relatively low temperature, condenses moisture from the air in the enclosure and maintains the relative humidity in the enclosure at a level which is determined by the chilling unit temperature. In the case of a refrigeration system which is found in the usual domestic refrigerator, the chilling unit temperature is such that the moisture in the chilled air amounts only to a trace, i.e. the relative humidity is substantially zero. The amount of water vapor in air in the enclosure is therefore, in any case, normally lower than the amount of water vapor in air ambient the enclosure so that a pressure differential exists between the air in the enclosure and the ambient air, which pressure differential is equal to the difference between the partial pressure of the water vapor in the ambient air and the partial pressure of water vapor in the air in the enclosure.

The aforementioned pressure differential effects a flow of moist ambient air into the refrigerated enclosure along any leakage paths existing at the boundary of an access door of the refrigerator, and when the ambient relative humidity increases, the pressure differential between the ambient and chilled air increases resulting in increased flow of moist ambient air into the air space and an increased rate of frost accumulation on the air chilling heat exchanger.

Fixed interval defrost controls obviously are not responsive to humidity, and such controls therefore can not initiate a defrosting cycle of an air chilling unit at times when it is necessitated by accumulation of frost on the chilling unit. For example, if a fixed interval defrosting control is set to provide defrosting of the air chilling unit at a rate corresponding to that build-up of frost which would be expected at 100 percent ambient relative humidity, the air chilling unit may be defrosted twice as often as necessary if the actual relative humidity of air ambient the refrigerator is 50 percent. During cold seasons of the year, the air within a home is normally considerably less than 50 percent relative humidity and the excess frequency of defrosting of a refrigerator located in such a home would be considerably greater.

It is also generally known that opening of an access door of a refrigerator admits relatively moist air into the refrigerator and deposits moisture in the form of frost on the heat exchange surfaces of an air cooling unit within the refrigerator. Certain prior art defrosting apparatus for refrigerators of the type referred to have provided for defrosting of heat exchange surfaces of refrigerator cooling units in response to frequency of door openings, or duration of door openings, or various other factors associated with opening access doors of refrigerators. However, such devices are similar to the timing devices referred to above in that they are not responsive to variations in relative humidity ambient the refrigerator which give rise to variations in leakage rates of ambient air into the enclosure. Thus, such controls are ineffective to compensate for the inevitable leakage of moist ambient air past a gasket or similar seal between the access door and the body of the refrigerator, which leakage occurs independently of opening the access door.

A principal object of the present invention is the provision of a new and improved defrosting control for a refrigerator or the like wherein periods between defrosting cycles of the cooling unit of the refrigerator are variable in response to sensed relative humidity of air, and durations of openings of an access door of the refrigerator.

Another object of the invention is the provision of a new and improved defrosting control for a refrigerator on the like wherein a defrosting means of the refrigerator is operated by electrically energized actuating means effective to initiate defrosting of the refrigerator after a cumulative amount of energization of the actuating means with the rate of energization of the actuating means depending upon sensed humidity of air ambient the refrigerator.

In carrying out the invention, an electrically powered timer motor is provided which actuates switch means controlling operation of the defrosting means. The timer motor is energized by the operation of control means including humidity responsive circuitry for energizing the motor at intervals depending on the humidity of air ambient the refrigerator, and switch means associated with an access door to energize the motor during periods when the access door is opened so that defrosting of an air cooling unit in the refrigerator is effected after a cumulative amount of energization of the timer motor, with the result that the periods between defrosting cycles of the refrigerator vary as a function of relative humidity of the ambient air.

Other objects and advantages of the present invention will become apparent from the following detailed description thereof made in reference to the accompanying drawings and wherein.

Figure 1:
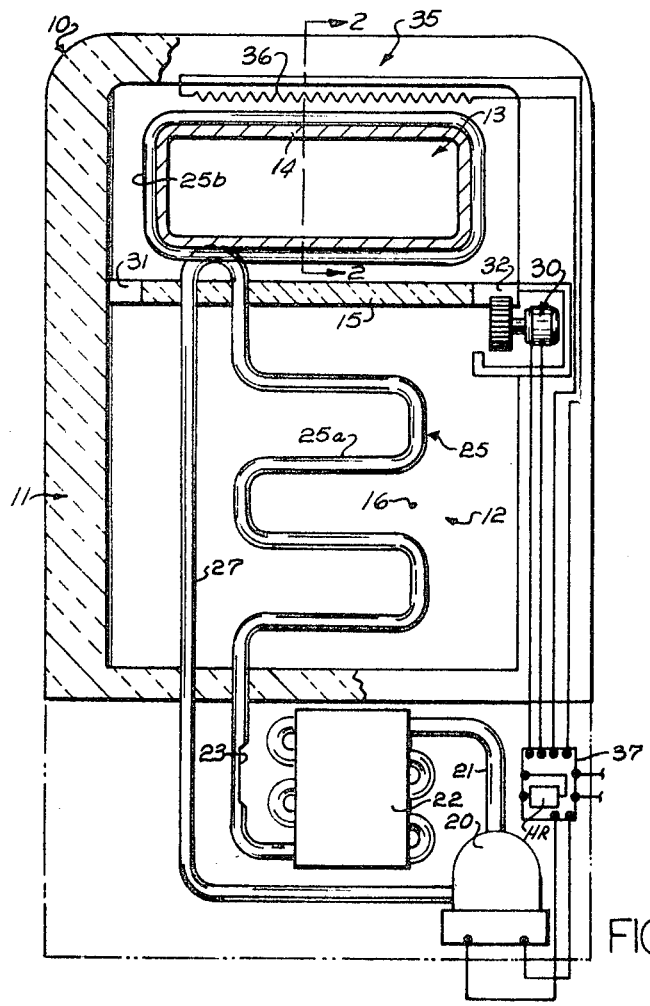
FIG. 1 is a schematic sectional view of a refrigerator embodying the present invention.

Control apparatus embodying the present invention is described and illustrated herein in conjunction with a refrigerator 10 of the household type which comprises insulating walls 11 defining a food compartment 12, in which temperatures are normally above freezing, and a freezing compartment 13 disposed in the upper portion of the refrigerator 10. The freezing compartment 13 is defined by a suitable enclosure 14 disposed in spaced relation to the insulating wall 11 and separated from the compartment 12 by an insulating wall 15. The compartments 12, 13 are closed by a common access door 16 which in the illustrated embodiment carries a gasket 16a (see FIG. 2) of conventional construction which seals the space between the edges of the door 16 and adjacent surfaces of the insulating walls 11 in the usual manner.

The refrigerator 10 further comprises a conventional compressor-condenser-evaporator refrigerating system including a motor-compressor 20 which discharges hot compressed refrigerant through its discharge tube 21 into a condenser 22 for cooling and liquefication. The liquefied refrigerant passes from the condenser 22 through a capillary 23, or equivalent restricting means, into an evaporator or air chilling unit 25 which includes an evaporator section 25a which is formed of tubing disposed in a serpentine configuration in, or adjacent, the rear wall of the compartment 12 and an evaporator section 25b in the freezing compartment 13. Refrigerant expanding in the evaporator section 25a absorbs heat from the food compartment 12 and passes into an evaporator section 25b which is in the form of a coil disposed about the freezing compartment enclosure 14. Containing evaporation of the refrigerant in the evaporator section 25b effects cooling of the freezing compartment 13 to a temperature substantially below the freezing point of water. The evaporated refrigerant is then returned by a suction line 27 to the intake side of the motor-compressor 20 to complete the refrigeration circuit.

Figure 2:
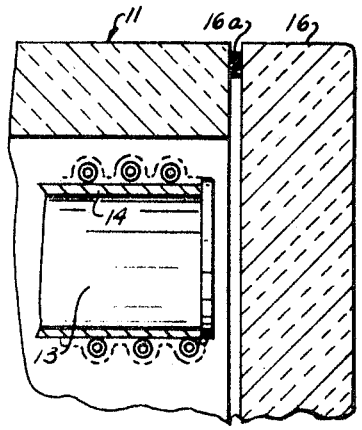
FIG. 2 is a fragmentary sectional view taken approximately at line 2—2 of FIG. 1.

Air in the compartments 12, 13 of the refrigerator 10 is circulated between the compartments 12, 13 by a suitably constructed electric fan 30, schematically illustrated, and openings 31, 32 are provided in the insulating wall 15 to allow such circulation. When the chilled air contacts the evaporator section 25b, the reduction in temperature of such air results in moisture being condensed out of the chilled air in the freezing compartment and frozen on the heat exchange surfaces of the evaporator section, as illustrated in FIG. 2, with the amount of frost or ice accumulated on the heat exchange surfaces being directly related to the moisture in the chilled air within the refrigerator. Put another way, the frost accumulation on the evaporator reduces the relative humidity of air in the refrigerator so that the relative humidity of the chilled air is controlled in effect by the chilling unit temperature. In a refrigerator of the type illustrated the chilling unit temperature is sufficiently low that substantially all of the moisture in the chilled air is condensed out and frozen.

It is well known that accumulation of frost on the heat exchange surfaces of an evaporator reduces the effectiveness of refrigeration systems and accordingly, means 35 are provided to periodically remove the accumulated frost from the heat exchange surfaces of the evaporator sections 25a, 25b. In the illustrated embodiment, the defrosting means 35 includes an electric heater element 36, which is shown schematically, and which is periodically energized, in a manner described in detail presently, to increase the temperature of the heat exchange surfaces of the evaporator section 25b above the melting point of ice. It will be apparent from the following description that any suitable defrosting means can be provided and that the illustrated electric heater is merely exemplary.

Figure 3:
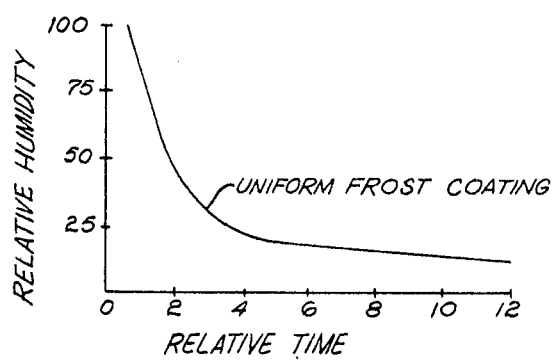
FIG. 3 is a graphic illustration of frost formation on heat exchange surfaces of an air cooling means as a function of relative humidity and relative time.

The relative humidity of air ambient the refrigerator 10 is related to the rate of frost accumulation on the heat exchange surfaces of the evaporator 25 due to leakage of ambient air past the gasket 16a into the refrigerator compartments 12, 13. FIG. 3 is illustrative of the relative time required to produce a uniform coating of frost on a heat exchange surface, as a function of the relative humidity of air giving up heat to the heat exchange surface. From FIG. 3, it is apparent that air at 100 percent relative humidity establishes a uniform coating of frost on a heat transfer surface in approximately one-half the time required for the same coating of frost to be deposited on the heat exchange surface by the air of 50 percent relative humidity. Air having a relative humidity of 25 percent deposits the coating of frost on the heat exchange surface in slightly more than three times the amount of time taken for air at 100 percent relative humidity to deposit the coating of frost, and percentages of relative humidity below 25 percent require significantly greater multiples of the time required to coat the surfaces by air of 100 percent relative humidity.

While the graphic representation of FIG. 3 represents frost accumulation in terms of relative time and relative humidity for one set of conditions and circumstances, it is known that frost accumulation varies with relative humidity and relative time in generally the manner shown by FIG. 3 and therefore, FIG. 3 may be considered representative of the general relationship between frost accumulation and relative humidity over a period of time.

As previously noted, the relative humidity of chilled air in the refrigerator 10 is substantially constant and is maintained at extremely low levels by the evaporator temperature. The relative humidity of air ambient the refrigerator is variable according to climatic conditions but generally contains a significantly greater amount of moisture than is contained in the chilled air within the refrigerator so that a pressure differential is established between the ambient air and chilled air within the refrigerator which differential to a large extent results from the difference in partial pressures of the water vapor in the chilled and ambient air respectively. The pressure differential referred to above is applied across the gasket 16a on the access door 16 and effects a flow of moist ambient air into the refrigerator through any gasket paths which may exist. Since gasket leakage is inevitable it follows that the leakage rate past the gasket depends on the pressure differential across the gasket, and since the pressure differential is a function of the differential relative humidity between air ambient the refrigerator and the inside air, the humidity of the ambient air determines the pressure differential and the moisture being added to the chilled air by leakage.

In accordance with the present invention, defrosting of the evaporator 25 of the refrigerator is effected in response to the relative humidity of air ambient refrigerator by control apparatus 37 (see FIG. 4) for the defrosting means 35 which initiates operation of the defrosting means 35 after a period of time which is dependent upon the relative humidity of the ambient air. The control apparatus 37 includes a switch S1 in the form of a double pole switch having a movable contact 40 which is operated between fixed contacts 41, 42 to control energization of the motor-compressor 20 and the defrost heater 36, respectively. When the movable contact 40 is in its position illustrated in FIG. 4, the motor-compressor 20 is connected through the switch S1 across terminals T1, T2 of a conventional alternating current power supply through an energizing circuit which is traceable from the terminal T1 to the motor-compressor 20, contacts 41, 40 of the switch S1, a junction 46 and to the terminal T2 of the power supply. When the moving contact 40 is closed on the contact 42, the energizing circuit for the motor-compressor 20 is opened and an energizing circuit for the defrosting means 35 is completed from the terminal T1 through the junction 45, a junction 47, the heater 36, the closed contacts of a thermostatic switch 50, contacts 42, 40 of the switch S1, the junction 46, and to the terminal T2 of the power supply.

The thermostatic switch 50 is of conventional construction and is positioned in heat exchange relation with the heat exchange surfaces of the evaporator section 25b so that when the temperature of this evaporator section has been increased above the melting point of ice, the contacts of the switch 50 are opened to terminate energization of the defrost heater independently of operation of the switch S1. While the switch 50 may be of any suitable construction, a bimetal actuated switch is preferred and is illustrated schematically in FIG. 4.

The switch S1 is operated by actuating means 51 including a timer motor 52 and a linkage L which, in the preferred embodiment of the invention, includes a gear reduction and cam 51a (shown schematically) operated by the timer motor 52. The gear reduction and cam 51a are of conventional construction and therefore have been illustrated schematically only, however, suffice it to say that when the timer motor 52 has been operated through a given number of revolutions of its armature, the cam 51a of the linkage L effects movement of the contact arm 40 away from the contact 41 and into engagement with the contact 42 to initiate a defrost cycle by effecting energization of the defrost heater 36 and interrupting the energization circuit for the motor-compressor 20. Upon a given number of revolutions of the armature of the timer motor 52, with the contacts 40, 42 of the switch S1 closed, the cam 51a of the linkage L will again move the contact arm 40 into engagement with the fixed contact 41 to re-energize the motor-compressor 20 for a subsequent refrigeration cycle.

During a refrigeration cycle, energization of the timer motor 52 is controlled according to the relative humidity of the air ambient the refrigerator. In the form shown in FIG. 4 control of the motor 52 is effected by switch means, such as a silicon controlled rectifier SCR, which is rendered conductive in a manner described presently, to complete an energization circuit for the timer motor 52 at times during positive half-cycles of the power supply. The energization circuit for the timer motor during positive half-cycles of the AC power supply is completed from the terminal T1 through the junctions 45, 47, the timer motor 52, a junction 55, anode and cathode electrodes of the SCR, junctions 56, 57, 58, 59 and to the terminal T2 of the power supply. During negative half-cycles of the power supply, a circuit for the motor 52 is completed from the terminal T2 through the junctions 59, 59, 57, 56, a junction 60, anode and cathode electrodes of a diode D1, a junction 61, junction 55, the motor 52, junctions 47, 45 and to the terminal T1.

The timer motor 52 is conventionally constructed AC induction motor which is operatively energized only in response to successive half-cycles of the power supply being applied across its field windings and which is de-energized when only alternate half-cycles of the power supply are impressed across its terminals. Thus, when the SCR is not conductive, the timer motor 52 is not energized (i.e. the armature does not rotate) since only the negative half-cycles of the power supply are impressed across its terminals through the diode D1. When the SCR is rendered conductive, full wave current is applied across the terminals of the motor 52 and after a few such successive half waves of the power supply have been impressed across the motor, the inertia of the armature is overcome and the motor is rendered operative to drive the cam 51a through the linkage L. When the SCR is rendered non-conductive, the armature of the timer motor 52 is abruptly stopped due to dynamic braking caused by the negative half-cycles of the power supply being impressed across the terminals of the motor 52.

The SCR is rendered conductive by sustained pulses to its control electrode 65 from the output of a humidity responsive control circuit generally indicated at 66. The control circuitry 66 includes a current limiting output section, generally indicated at 66a, including a germanium transistor Q1, a voltage controlled conductor means 67 in the form of a neon tube or bulb which is turned on to supply current to the current limiting circuit, and a humidity responsive triggering circuit for rendering the neon bulb 67 conductive to provide a pulse to the gate 65 of the SCR through the current limiting output circuit.

The control circuitry 66 is connected across the terminals T1, T2 of the power supply between the junctions 47, 59 through a rectifier formed by a series connected diode D2 and capacitor C1 which cooperate in a well-known manner to provide filtered DC power to the control circuitry 66. The triggering circuit portion of the control circuit 66 includes an input circuit formed by a humidity responsive resistance network 70 and a capacitor C2 connected between a junction 71 at the output of the filter, and the junction 58 so that the capacitor C2 is charged from the junction 71 through the resistance network 70, a junction 72, the capacitor C2, junctions 58, 59 and to the terminal T2.

The resistance network 70 is formed by a humidity responsive resistance HR connected in series with a fixed resistor R1; and a fixed resistor R2 which is connected in parallel with the humidity responsive resistor HR and the resistor R1 across the junctions 73, 74. It is apparent that the rate at which the capacitor C2 is charged through the resistance network 70 varies according to changes in the resistance of the humidity responsive resistor HR, and that as the resistance of the humidity responsive resistor increases, the charging rate of the capacitor C2 decreases, while decreases in the resistance of the humidity responsive resistor HR result in an increased charging rate for the capacitor C2.

While any suitable humidity responsive resistance means may be used in the network 70, it has been found that a thin strip of synthetic plastic material, such as nylon, has the characteristic of a reduction of resistance when exposed to air having a high relative humidity and an increasing resistance as the relative humidity of air in contact therewith is reduced. Accordingly, the humidity responsive resistance HR is constructed of a strip of nylon and may be positioned in any suitable place on the refrigerator for contact with air ambient the refrigerator. In the illustrated embodiment, the resistor HR is positioned on circuit board in the compressor compartment of the refrigerator (see FIG. 1).

The neon bulb 67 is connected to the junction 72 between the resistance network 70 and capacitor C2, and through the current limiting portion 66a of the control circuit to the junction 57 which is at the voltage of the terminal T2. When the voltage at the junction 72 has increased to a predetermined level above the voltage at junction 57, which lever is determined by the charge on the capacitor C2, the voltage across the neon tube 67 is sufficient to fire the tube 67 resulting in abrupt conduction of the neon tube as is well known. When the tube 67 is rendered conductive, the capacitor C2 discharges through the tube 67 at a rate determined by the current limiting section 66a of the control circuit to provide a sustained pulse to the gate 65 of the SCR until such time as the voltage across the neon tube 67 is reduced to the turn off level for the tube.

During the time the neon tube 67 is maintained conductive, the capacitor C2 discharges therethrough to establish an input circuit for the transistor Q1 from the capacitor plate C2a through the neon tube 67, junction 75, a resistor R3, emitter and base electrodes 76, 77 respectively, of the transistor Q1, a junction 78, resistor R4, a junction 80, the gate 65 of the SCR and to the plate C2b of the capacitor C2 through the junctions 56–58. A resistor R5, connected between the junction 80 and the junction 57, establishes a desired gating voltage level across the gate 65 and cathode of the SCR.

Conduction in the input circuit of the transistor Q1 results in transistor action of that transistor to render its emitter-collector circuit conductive; which circuit may be traced from the junction 72 through the neon tube 67, junction 75, resistor R3, emitter 76 and collector 81 of the transistor Q1, junction 80, gate 65 of the SCR to the plate C2b of the capacitor C2 through the junctions 56–58. A diode D3 is connected between the junction 75 and the junction 78 at the base electrode 77 of the transistor Q1 to clamp the voltage at the junction 78 negative relative to the voltage at the junction 75. The current flow to the resistor R3 is such that its voltage drop is equal to the forward voltage drop across the diode D3 less the base-emitter volage of the transistor Q1 and thus, the transistor Q1 is maintained conductive during the time the neon tube 67 conducts, but the transistor Q1 conducts only a limited amount of current through its emitter-collector circuit which provides for a sustained pulse being transmitted to the gate 65 of the SCR.

As previously noted, when the gate 65 of the SCR is pulsed, full wave AC is impressed across the timer motor 52 resulting in rotation of the armature thereof and operation of the linkage L. When the capacitor C2 is discharged to the point where the voltage across the neon tube 67 is at its turn-off voltage, the tube 67 no longer sustains conduction resulting in the SCR being rendered non-conductive so that only alternate negative half-cycles of the power supply are impressed across the terminals of the timer motor 52. When the neon tube 67 is non-conductive as described, the capacitor C2 is again charged through the resistance network 70 to the firing voltage of the tube 67 at which time the SCR is again rendered conductive as described previously. It is believed apparent that the firing voltage of the tube 67 is of larger magnitude than its turn-off voltage and that the difference between these voltages can be controlled by selection of the desired neon tube. Thus, the timer motor 52 is intermittently energized from the control circuitry 66 with the intervals between successive energizations of the motor 52 depending upon the humidity of air ambient the refrigerator as sensed by the humidity responsive resistance HR and reflected in the charging rate of the capacitor C2 varying as the sensed humidity varies.

In addition to controlling the energization of the motor 52 by the SCR, the motor is also controlled according to the duration of the door openings of the compartment 12. In the embodiment of the invention illustrated in FIG. 4, a door operated switch S2 is provided which closes the circuit of the timer motor to compensate for the warm, moist air which is likely to flow into the refrigerator during access door openings. The switch S2 is closed and opened by opening and closing, respectively, of the access door 16 so as to energize the timer motor 52 from the terminal T1 of the power supply through junctions 45, 47, the timer motor 52, junctions 55, 61, 85, fixed contact 86 and moving contact 87 of the switch S2, junctions 46, 90, 60 and 56–59 to the terminal T2. It is apparent that the conductive path through the switch S2 is maintained during both positive and negative half cycles of the power supply so that the motor 52 is continuously run when the access door 16 of the refrigerator is opened.

Figure 4:
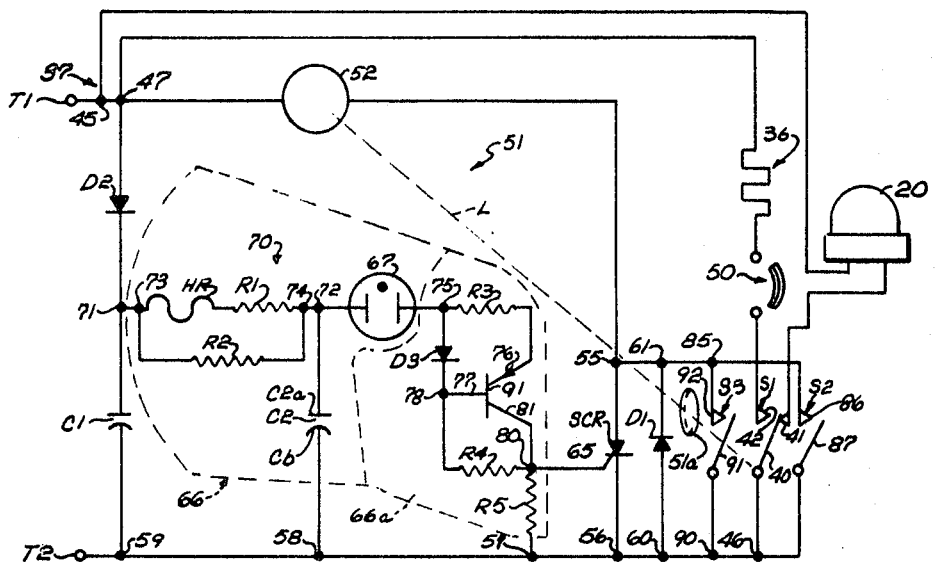
FIG. 4 is a schematic illustration of a portion of control apparatus forming a part of the refrigerator of FIG. 1.

When the timer motor 52 has been cumulatively energized by operation of the control circuitry 66 and by operation of the door switch S2 to an extent sufficient to rotate the cam 51a of the linkage L through a given angle of rotation, the linkage L is operative to actuate the switch S1 to initiate a defrost cycle, as described previously, and also closes a switch S3 which includes a moving contact 91 which is moved from the position shown in FIG. 4 to a position wherein the moving contact 91 is engaged with a fixed contact 92. Closing of the contacts 91, 92 of the switch S3 connects the timer motor 52 across the terminals T1, T2 of the power supply through a conductive path including the junctions 45, 47, the timer motor 52, junctions 55, 61, 85, switch S3, junctions 90, 60 and 56–59. While the timer motor 52 is continuously energized through the switch S3, the linkage L is operative to maintain the switches S1, S3 in their defrost cycle positions for a predetermined time which is determined to be greater than the expected maximum amount of time for defrosting of the heat exchange surfaces of the evaporator 25, after which the linkage L is operated to move the contacts 40, 91 of the switches S1, S3, respectively, back to their positions illustrated in FIG. 4 and thereby initiate a succeeding refrigeration cycle of the refrigerator 10. It should be apparent that the thermostatic switch 50 normally interrupts the energizing circuit for the defrosting heater 36 prior to actuation of the switches S1, S3 so that termination of operation of the heater means 35 is normally controlled thermostatically while the maximum length of time between refrigeration cycles is determined by the timer motor 52.

Figure 5:
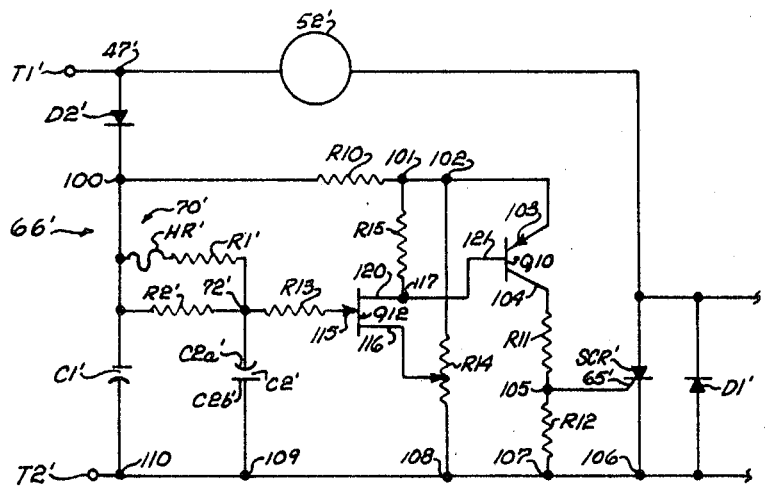
FIG. 5 is a schematic illustration of modified control apparatus similar to that shown in FIG. 4.

FIG. 5 illustrates a modified control circuit which functions in substantially the same manner as that described above in reference to FIG. 4 in that a controlled rectifier is triggered by sustained pulses to its gate to effect energization of a timer motor 52 at intervals dependent upon the sensed humidity of air ambient the refrigerator 10. Accordingly, elements similar to elements previously referred to in the description of FIG. 4 are illustrated in FIG. 5 by corresponding reference characters having a prime notation.

The SCR' and diode D1' are connected in circuit with the timer motor 52' so that when the SCR' is rendered conductive, the timer motor 52' is energized by full wave alternating current applied thereto across the terminals T1', T2'. The SCR' is triggered in response to conduction in the output circuit of a PNP silicon transistor Q10, which circuit can be traced from the terminal T1' to a junction 47', a diode D2', a junction 100, resistor R10, junctions 101, 102, emitter 103 and collector 104 of the transistor Q10, a resistor R11, a junction 105, the gate electrode 65' of SCR', and to the terminal T2' of the power supply, through junctions 106–110. The diode D2' combines with a capacitor C1' to provide filtered DC to the control circuitry 66' so that the voltage across the output circuit of the transistor Q1' is a relatively constant direct current. The resistor R12 connected between the junctions 105, 107, establishes a gating voltage level at the gate 65' of SCR' as described previously in reference to resistor R5 of FIG. 4.

The transistor Q10 is rendered conductive to trigger the SCR' in response to conduction of a voltage controlled conductor in the form of a field effect transistor Q12, having its gate electrode 115 connected through a resistor R13 to a junction 72'. The junction 72' is connected between a resistance network 70' and a capacitor C2' which form a humidity responsive signal circuit as described above in reference to FIG. 4. The source electrode 116 of the transistor Q12 is connected to the wiper of a potentiometer R14 which potentiometer is connected between the junctions 102, 108. When the transistor Q12 is non-conducting, the potentiometer R14 establishes a positive voltage at the source electrode 116 relative to the gate electrode 115 to insure "pinching off" of the transistor Q12 at low charge levels on the capacitor C2'. The capacitor C2' is charged through the humidity responsive resistance network 70' to a condition wherein the voltage at its plate C2a', (and therefore, the voltage at the gate electrode 115 of the transistor Q12) is sufficiently high relative to the voltage at the source electrode 116 that the transistor Q12 is rendered conductive to establish a circuit through its drain and source electrodes 120, 116, respectively, from the junction 100, through resistor R10, junction 101, a resistor R15, junction 117, drain 120 and source 116 of the transistor Q12, the potentiometer R14, junctions 108–110, and to the terminal T2' of the power supply.

Conduction of the drain and source circuit of the transistor Q12 reduces the voltage level at the junction 117 which is connected to the base 121 of the transistor Q10 so that an input circuit for the transistor Q10 is established through its emitter 103 and base 121 to the junction 117, and through the drain and source circuit of the transistor Q12. As a result of the conduction of the input circuit of the transistor Q10, that transistor is abruptly turned on with its output circuit being effective to trigger the SCR', as described above.

Turning on of the transistor Q10 results in a voltage drop across the resistor R10 and a corresponding drop in the voltage level provided at the source electrode 116 of the transistor Q12 by the potentiometer R14 so that the transistor Q12 is maintained ina conductive state as the capacitor C2' discharges therethrough. It is apparent that the capacitor C2' discharges from the plate C2a' through the junction 72', resistor R13, gate and drain electrodes of the transistor Q12, potentiometer R14, junctions 108, 109 and to the plate C2b' of the capacitor. When the capacitor C2' has discharged sufficiently so that the gate 115 of the transistor Q12 is sufficiently negative with respect to its source 116, the transistor Q12 is rendered nonconductive causing an abrupt turning off of the transistor Q10 as the base electrode 121 is again rendered positive with respect to the emitter 103. Setting of the potentiometer R14 is performed during manufacturing and compensates for variations in the field effect transistors from unit to unit.

The time during which the capacitor C2' discharges provides a sustained pulse to the gate 65' of SCR' as described above, so that the timer motor 52' is energized during such pulse period as controlled by conduction of the transistors Q10, Q12. Cyclic triggering of SCR', therefore, is controlled by the charging rate of the capacitor C2' as determined by the humidity of the air ambient the refrigerator 10, sensed by the network 70', as described above in reference to FIG. 4. It is to be understood that the modified circuitry illustrated in FIG. 5 is in practice combined with switches S1, S2, S3 as described above in reference to FIG. 4, so that the timer motor 52' is operated by an access door of the refrigerator as well as in response to sensed humidity and that since such switching apparatus is the same as described above, it is not illustrated in FIG. 5.

It can now be seen that a new and improved defrost control apparatus has been provided wherein a defrosting means of a refrigerator or refrigeration sytsem is rendered operative to defrost heat exchange surfaces of a cooling unit of the refrigeration system in response to the sensed humidity of air ambient an enclosure being cooled. The invention further provides for performance of a defrosting cycle of refrigeration apparatus in response to a duration of access door openings of the enclosure being chilled in addition to the humidity responsive aspect of the defrosting.

Although any combination of suitable circuit elements might be used in constructing the control circuitry described above, the following listing of elements has been used in conjunction with circuitry constructed in accordance with FIGS. 4 and 5.

FIG. 4

Resistors:
```
R1  _____megohms__  31
R2  _____do____    68
R3  _____do____   330
R4  _____kilohms__ 180
R5  _____do____   4.7
HR  _____megohms @ 50% R.H__     100
```

Diodes:
```
D1  _____  1N459
D2  _____  1N459
D3  _____  1N251
```

Capacitors:
```
C1  _____μfd., 200 v. D.C__  2
C2  _____μfd__  2
```

```
SCR  _____  C-106B
Tube 67 _____  NE-23
Transistor Q1 _____  2N2614
```

FIG. 5

Resistors:
```
R1' _____megohms__  31
R2' _____do____    31
R10 _____kilohms__ 330
R11 _____do____    27
R12 _____do____    47
R13 _____megohms__ 10
R14 _____kilohms__ 50
R15 _____do____    10
HR' _____megohms @50% R.H__      100
```

Diodes:
```
D1' _____  1N459
D2' _____  1N459
```

Capacitors:
```
C1' _____μfd., 200 v. D.C__  0.1
C2' _____μfd.,  50 v. D.C__  0.1
```

Transistors:
```
Q10 _____  2N3638
Q12 _____  2N3819
SCR' _____  C-106B
```

Having described my invention, I claim:

1. Control apparatus for defrosting means in a refrigeration system comprising, a switch operable between a first condition wherein said defrosting means is inoperative and a second condition wherein said defrosting means is rendered operative, electrically energized actuating means operable to actuate said switch to said first condition and to actuate said switch to said second condition after a period determined by a predetermined cumulative amount of energization thereof following actuation of said switch to said first condition, and control means for said actuating means operable to effect electrical energization of said actuating means at rates dependent upon humidity of air ambient said refrigeration system so that the length of said period is varied according to said humidity.

2. Control apparatus as defined in claim 1 wherein said actuating means includes an electric motor and a linkage driven by said motor, said linkage controlling operation of said switch and said motor being intermittently energized by said control means.

3. Control apparatus as defined in claim 2 wherein said electric motor is an AC induction motor connected across a power supply, and said control means includes a semiconductor switch element for effecting operative energization of said motor to operate said linkage.

4. Control apparatus as defined in claim 2 wherein said linkage includes a cam member driven by said motor and operative after a predetermined amount of rotation to actuate said switch and render said defrosting means operable.

5. Control apparatus as defined in claim 1 and further including a second switch connected in circuit with said electrically operated actuating means and switch actuating means for operating said second switch to energize said actuating means independently of said control means.

6. Control apparatus as defined in claim 5 wherein said refrigeration system is effective to chill air in an enclosure having an access door, said access door operable when opened to operate said switch actuating means and energize said electrically operated actuating means.

7. Control apparatus as defined in claim 1 wherein said control means includes control circuit means having an output circuit which is rendered conductive to effect operation of a semiconductor switch connected in circuit with said actuating means, and energize said actuating means an an input circuit including humidity responsive resistance means operative to provide an input signal for said control circuitry which is a function of sensed humidity.

8. Control apparatus as defined in claim 7 wherein said input circuit includes a capacitance element connected in circuit with said humidity responsive resistance means and charged at a rate dependent upon the resistance of said resistance means, said output circuit of said control circuit being rendered conductive in response to a predetermined charged condition of said capacitance element and maintained conductive by discharge of said capacitance element therethrough to maintain said semiconductor switch effective to energize said actuating means.

9. Control apparatus as defined in claim 1 wherein said control means includes a voltage controlled conductor means connected across a power supply, said voltage controlled conductor means being rendered conductive upon establishment of a first predetermined voltage thereacross and rendered non-conductive at a second voltage thereacross which is lower than said first voltage, switch means operable in response to conduction of said voltage controlled conductor means to energize said actuating means, and said control means further including humidity responsive circuit means for establishing said first predetermined voltage across said controlled conductor means.

10. Control apparatus as defined in claim 9 wherein said voltage controlled conductor means is a neon tube.

11. Control apparatus as defined in claim 10 wherein said switch means is a semiconductor switch having a gate electrode connected to said neon tube through a current limiting circuit.

12. Control apparatus as defined in claim 9 wherein said humidity responsive circuit means includes an R-C circuit including a humidity responsive resistance element and a capacitor connected in series there with which is charged through said humidity responsive resistance at a rate dependent upon sensed humidity, said voltage controlled conductor means connected to said series circuit intermediate said resistance and capacitor elements.

13. Control apparatus as defined in claim 9 wherein said voltage controlled conductor means includes a field effect transistor, resistance means connected to a source electrode of said transistor to determine said first voltage level when said transistor is non-conducting, and a circuit element effective to reduce the voltage at said source electrode in response to conduction of said transistor and thereby determine said second voltage level.

14. Refrigeration apparatus as defined in claim 1 in which said control means effects electrical energization of said actuating means at increased rates in response to increases in the relative humidity of said air.

15. In a refrigeration system for chilling air in an enclosure, an air chilling heat exchanger, means for periodically defrosting said heat exchanger whereby said exchanger is operated in alternate air chilling and defrosting cycles, and control apparatus for said defrosting means comprising electrically energized actuating means energized during the air chilling cycle of said exchanger to effect initiation of said defrosting means after a cumulative period of electrical energization of said actuating means, and control means for effecting energization of said actuating means in response to relative humidity of air ambient said system.

16. Refrigeration apparatus as defined in claim 15 wherein said control means for said actuating means includes an output circuit operable between conductive and non-conductive conditions and operative in one of said conditions to effect energization of said actuating means, and circuit means controlling the condition of said output circuit including a signal circuit having an impedance which varies in response to changes in humidity of said ambient air and voltage responsive conductor means connected to said signal circuit which is operable between conductive and non-conductive states by said signal circuit to change the condition of said output circuit.

17. Refrigeration apparatus as defined in claim 16 wherein said signal circuit includes humidity responsive resistance means connected in series circuit with a capacitance element to effect charging of said capacitance element at a rate dependent upon humidity sensed, said series circuit connected to said voltage responsive conductor and effective to trigger said voltage responsive conductor at a predetermined charge condition of said capacitor said capacitor discharging and maintaining said voltage responsive conductor conductive until a second charge condition on said capacitor is reached.

18. Refrigeration apparatus as defined in claim 16 wherein said voltage responsive conductor includes a field effect transistor which is rendered conductive at a first voltage level in said signal circuit and is non-conductive at a relatively lower second voltage level in said signal circuit.

19. Refrigeration apparatus as defined in claim 18 wherein said voltage responsive conductor further includes a variable resistance element connected to a source electrode of said field effect transistor for providing a first voltage at said source electrode when said transistor is non-conducting; and resistance element in said output circuit cooperating with said variable resistance to reduce the voltage at said source electrode when said output circuit is conductive.

20. Refrigeration apparatus as defined in claim 16 wherein said voltage responsive conductor means includes a bistable gas-filled tube.

21. In a refrigerating system as defined in claim 15 further characterized by said enclosure including an access door, and means actuated by opening of said access door to energize said actuating means during the period said door is open.

22. In a refrigerating system as defined in claim 15 further characterized by said enclosure including an access door, and means actuated by opening of said access door to override the action of said control means and energize said actuating means during the period said door is open.

23. In a refrigerating system as defined in claim 15 further characterized by means to enerize said actuating means at a maximum rate during said air chilling cycle and irrespective of operation of said control means.

References Cited

UNITED STATES PATENTS

| 2,268,769 | 1/1942 | Newton | 62—176 |
| 2,324,309 | 7/1943 | McCloy | 62—153 |
| 3,012,411 | 12/1961 | Kjellman | 62—173 |
| 3,029,611 | 4/1962 | Kuhn | 62—155 XR |

MEYER PERLIN, Primary Examiner

U.S. Cl. X.R.
62—155, 176, 234